G. L. Gerard,

Table Leaf Support.

No. 4,146. Reissued Oct. 4. 1870.

Witnesses
John H. Shumway
A. J. Tibbits

Inventor.
Geo. L. Gerard.
Inventor
By his Attorney
John E. Earle

N. PETERS, PHOTO-LITHOGRAPHER, WASHINGTON, D. C.

United States Patent Office.

GEORGE L. GERARD, OF NEW HAVEN, CONNECTICUT.

Letters Patent No. 106,353, dated August 16, 1870; reissue No. 4,146, dated October 4, 1870.

IMPROVEMENT IN TABLE-LEAF SUPPORTERS.

The Schedule referred to in these Letters Patent and making part of the same.

*To all whom it may concern:*

Be it known that I, GEORGE L. GERARD, of New Haven, in the county of New Haven and State of Connecticut, have invented a new and improved Table-leaf Supporter; and I do hereby declare the following, when taken in connection with the accompanying drawing and the letters of reference marked thereon, to be a full, clear, and exact description of the same, and which said drawing constitutes part of this specification, and represent in—

Figure 1:
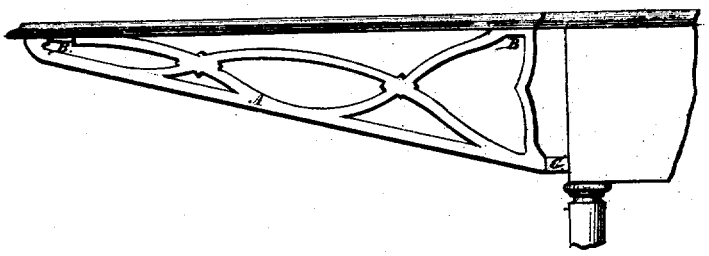
Figure 2:
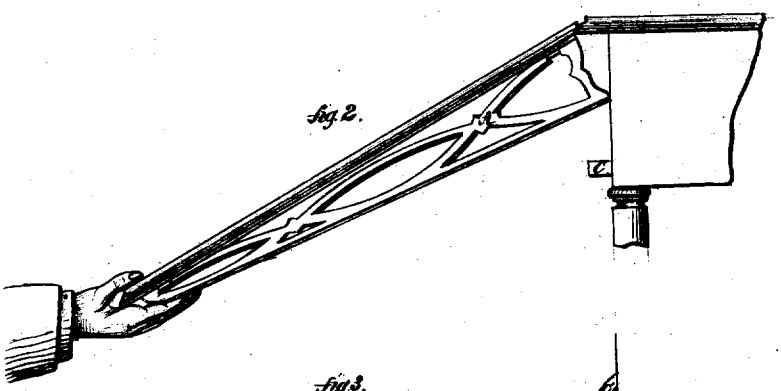
Figure 3:
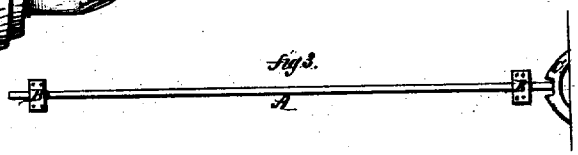

Figure 1 a side view, showing the leaf raised, and the support in operation;

Figure 2, a side view, showing the support partially folded as the leaf is being closed; and in Figure 3, a top view of the support detached from the leaf, showing its position when held by the stop.

This invention relates to an improvement in device for supporting hinged or folding leaves, as for tables and similar purposes, and consists in the arrangement of a bracket, hinged to the leaf, so as to fold transversely up against the leaf, and combined with a stop constructed so as to catch and hold the bracket when the leaf is raised.

A represents a bracket, which is attached to the under side of the folding or swinging leaf D, by means of hinges B B. This bracket may be made in any suitable manner, and of any proper material.

C represents the stop, constructed so as to catch and hold the bracket when dropped into position for supporting the leaf, as seen in figs. 1 and 3, there represented as a notch in the stop, into which the bracket latches.

When it is desired to use the leaf, it is simply necessary to raise it with the hand, when the bracket will fall at once into its proper place by its own weight, in which position the stop secures the bracket.

It is easily caused to pass the small projection upon the adjacent side of the stop by elevating the leaf slightly above the level of the table, but when once in place, it is securely held from accidental displacement by the weight of the leaf.

I do not claim the employment of a bracket, but do claim as my invention—

The arrangement of the bracket A upon the under side of a swinging leaf, combined with a stop, C, constructed so as to catch and hold the bracket when the leaf is raised, substantially as described.

Witnesses: GEO. L. GERARD.

J. H. SHUMWAY,

A. J. TIBBITS.